D. T. TIMBERLAKE.
PULLEY.
APPLICATION FILED JAN. 2, 1915.
1,171,562.
Patented Feb. 15, 1916.
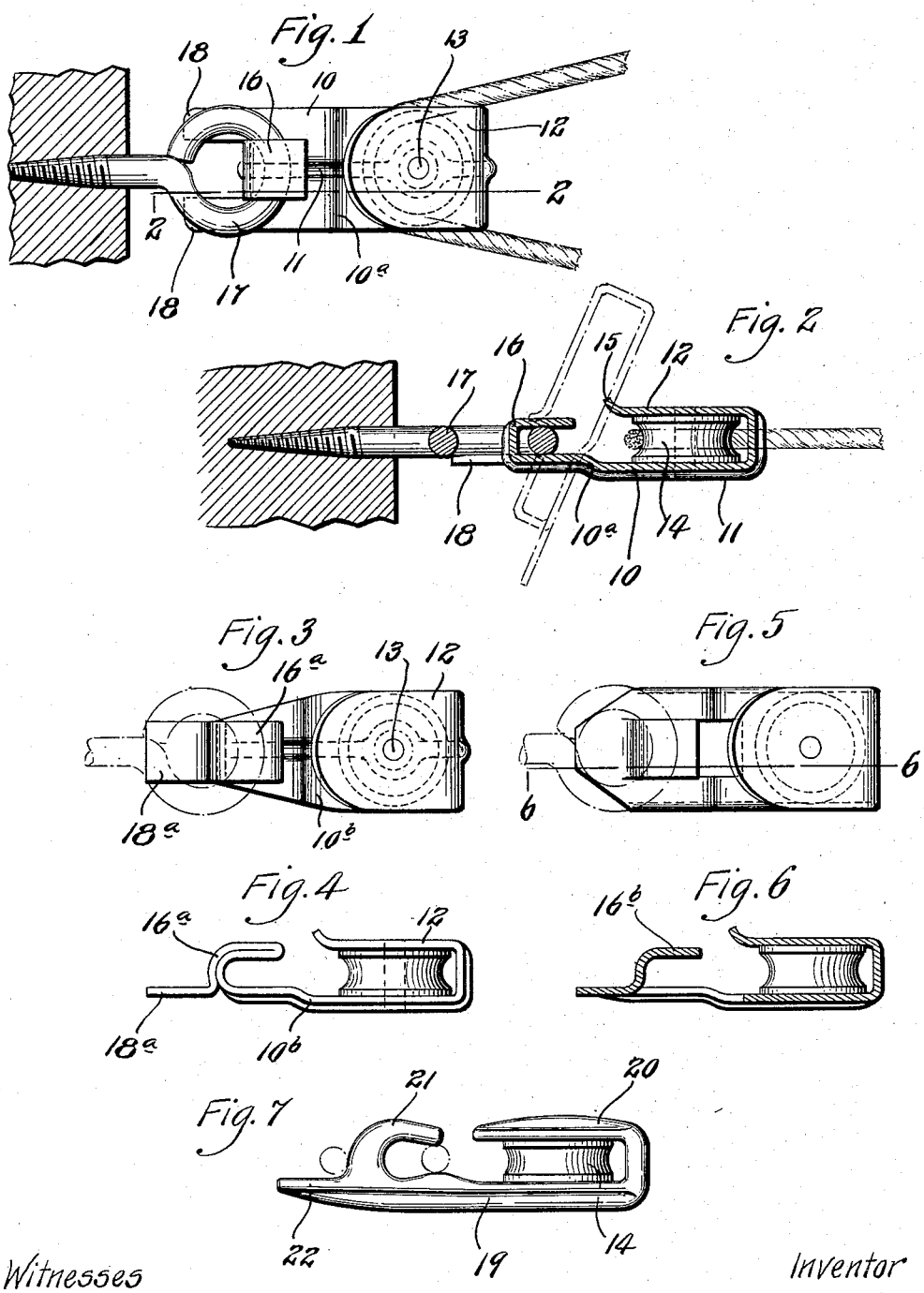
Witnesses
Inventor
Daniel T. Timberlake
By ____, Atty.
THE COLUMBIA PLANOGRAPH CO., WASHINGTON, D. C.

UNITED STATES PATENT OFFICE.

DANIEL T. TIMBERLAKE, OF ST. LOUIS, MISSOURI.

PULLEY.

1,171,562.  Specification of Letters Patent.  Patented Feb. 15, 1916.

Application filed January 2, 1915. Serial No. 213.

*To all whom it may concern:*

Be it known that I, DANIEL T. TIMBERLAKE, a citizen of the United States, residing at the city of St. Louis, State of Missouri, have invented a certain new and useful Improvement in Pulleys, of which the following is a full, clear, and exact description, such as will enable others skilled in the art to which it appertains to make and use the same, reference being had to the accompanying drawings, forming part of this specification, in which—

Figure 1 is a plan view of a pulley of my improved construction. Fig. 2 is a vertical section taken approximately on the line 2—2 of Fig. 1. Fig. 3 is a plan view of a modified form of the pulley. Fig. 4 is a side elevational view of the modified form of pulley seen in Fig. 3. Fig. 5 is a plan view of a further modified form of the pulley. Fig. 6 is a vertical section taken approximately on the line 6—6 of Fig. 5. Fig. 7 is a side elevational view of a further modified form of the pulley.

My invention relates to pulleys of the type ordinarily used in supporting clothes lines, guy lines for electric cables and wires; for boat rigging and like purposes, the principal object of my invention being to provide a comparatively simple inexpensive pulley which is constructed so as to swing only through the arc of a circle which occupies the same plane with that occupied by the ring or support to which the pulley is connected, and in order to accomplish this object, I propose to provide the block which carries the grooved wheel with an extension which serves as a bearing against the ring or staple on which the pulley is mounted, and thus said pulley is held in the same plane with its support.

With the foregoing and other objects in view, my invention consists in certain novel features of construction and arrangement of parts, hereinafter more fully described and claimed.

Referring to the form of pulley illustrated in Figs. 1 and 2 it will be seen that the body of the block or grooved wheel support is formed of sheet metal bent to form a substantially flat plate 10, the same being preferably provided with a centrally arranged longitudinally extending reinforcing rib 11 and one end of this plate is bent upwardly and thence inwardly to form a plate 12 which is parallel with and spaced apart from the plate 10.

Seated in the plates 10 and 12 are the ends of a pin or shaft 13 and loosely mounted thereupon is a grooved wheel 14. In some instances, the wheel may be provided with trunnions which are seated in the plates 10 and 12 and serve as bearings for said grooved wheel. The end of plate 12 is preferably bent upward as designated by 15 in order to facilitate the passage of the rope or cable into the space within the block which is occupied by the grooved wheel. The end of plate 10 opposite the end which carries the grooved wheel is slotted lengthwise to form a centrally arranged portion which is bent upward and thence outward to form a hook 16, the same projecting toward the grooved wheel and when the pulley is applied for use this hook engages through the screw eye or staple 17 which serves as the pulley support. The slotting of the plate 10 to form the hook 16 provides a pair of fingers 18 which extend beyond the side portions of said hook and these fingers serve as bearings to engage the underside of the screw-eye or staple to which the device is applied. This construction provides for the free swinging movement of the pulley through the arc of a circle which occupies the same plane as the screw-eye or support, and consequently the rope or cable which passes around the grooved wheel 14 is maintained in proper position.

The end of hook 16 terminates a short distance from the upturned ends 15 of plate 12 and the opening between these parts permits the rope or cable to be dropped into position on the grooved wheel and it also permits the hook 16 to be engaged through the screw-eye or staple.

The plate 10 is preferably provided with a transversely disposed shoulder or offset 10$^a$ in order to bring the center of wheel 14 into direct alinement with the center of hook 16, thus providing for the direct application of the strains of the supported rope or cable to the screw-eye or pulley support.

In the modified form of device illustrated in Figs. 3 and 4 the plate 10$^b$ which forms the body of the block is bent double in front of the grooved wheel to form the hook 16$^a$ which engages the screw-eye or support, and the end of said plate 10$^b$ is extended beyond this hook 16$^a$ to form a finger 18$^a$ which serves as a bearing against said screw-eye or support.

In the modified construction illustrated in Figs. 5 and 6 a hook 16$^b$ is formed by slotting the plate and bending the material between the slots upwardly and the material to the sides of said upwardly bent hook and to the rear thereof serve as bearings which engage the screw-eye or pulley support.

In the form of device illustrated in Fig. 7 the block is cast and comprises a substantially straight body portion 19, overhanging portion 20, hook 21 which projects toward overhanging portion 20, and finger 22 to the rear of hook 21. The grooved wheel in this form of device is journaled beneath the overhanging portion 20.

A pulley of my improved construction is comparatively simple, can be easily and cheaply manufactured and by being provided with bearing fingers adjacent to the hook which serves as the point of attachment for the pulley, the same is constrained to swing through the arc of a circle which is in the same plane with the screw-eye, staple or other part upon which said pulley is mounted.

A pulley of my improved construction is particularly adapted to serve as a support for clothes lines, for the guy lines of tents and awnings, and it can also be advantageously used in connection with boat rigging and the like.

It will be readily understood that minor changes in the size, form and construction of the various parts of my improved pulley can be made and substituted for those herein shown and described, without departing from the spirit of my invention, the scope of which is set forth in the appended claims.

I claim:

1. In a pulley, a block provided near one end with an attaching hook, a bearing member projecting forwardly from said block below said hook, a grooved wheel journaled on the block, and there being an opening formed in said block between the point of the hook and said grooved wheel.

2. In a pulley, a block provided near one end with an attaching hook, bearing members on said block below and to the sides of said hook, a grooved wheel journaled on said block and there being an opening formed in said block to the side of said grooved wheel.

In testimony whereof I hereunto affix my signature in the presence of two witnesses, this 30th day of December, 1914.

DANIEL T. TIMBERLAKE.

Witnesses:
M. O. SMITH,
M. A. HANDEL.

Copies of this patent may be obtained for five cents each, by addressing the "Commissioner of Patents, Washington, D. C."